United States Patent
Brown et al.

(10) Patent No.: US 6,909,356 B2
(45) Date of Patent: Jun. 21, 2005

(54) METHOD AND APPARATUS FOR ASSOCIATING THE MOVEMENT OF GOODS WITH THE IDENTITY OF AN INDIVIDUAL MOVING THE GOODS

(75) Inventors: Suzy Brown, Menlo Park, CA (US); David Kucharczyk, Santa Fe, NM (US)

(73) Assignee: SeeControl, Inc., Menlo Park, CA (US)

(*) Notice: Subject to any disclaimer, the term of this patent is extended or adjusted under 35 U.S.C. 154(b) by 479 days.

(21) Appl. No.: 10/053,540

(22) Filed: Nov. 2, 2001

(65) Prior Publication Data

US 2002/0118111 A1 Aug. 29, 2002

Related U.S. Application Data

(60) Provisional application No. 60/245,767, filed on Nov. 3, 2000.

(51) Int. Cl.[7] .................................................. G05B 19/00
(52) U.S. Cl. ..................... 340/5.2; 340/5.92; 340/572.1; 705/28
(58) Field of Search .................. 340/5.2, 5.8, 5.92, 340/539.1, 572.1, 666; 235/462.01, 462; 348/143; 705/28

(56) References Cited

U.S. PATENT DOCUMENTS

| | | | | |
|---|---|---|---|---|
| 5,363,425 A | * | 11/1994 | Mufti et al. ................ | 340/10.1 |
| 5,664,113 A | * | 9/1997 | Worger et al. ................ | 705/28 |
| 5,682,142 A | * | 10/1997 | Loosmore et al. ........ | 340/10.51 |
| 5,708,423 A | * | 1/1998 | Ghaffari et al. .............. | 340/5.8 |
| 5,777,884 A | * | 7/1998 | Belka et al. .................. | 705/22 |
| 5,963,134 A | * | 10/1999 | Bowers et al. ............. | 340/10.1 |
| 6,300,873 B1 | * | 10/2001 | Kucharczyk et al. ......... | 340/5.2 |
| 2001/0051905 A1 | * | 12/2001 | Lucas .......................... | 705/28 |

* cited by examiner

*Primary Examiner*—Thomas Mullen
(74) *Attorney, Agent, or Firm*—Blakely, Sokoloff, Taylor & Zafman LLP.

(57) ABSTRACT

A tracking system monitors an entity that enters a controlled space and the addition, removal, or other movement or status changes of objects in the controlled space. A computer system, coupled to the tracking system, automatically associates the addition, removal or other movement or status changes of the objects with the identity of the entity and transmits this information to a server computer system. A user may subsequently access this information through one or more client computers coupled to the server computer system. The server computer system may also automatically notify a user or other computer systems, e.g., through a network interface, wireless interface, or telephone interface, when objects in the controlled space have been moved or the status has been changed and/or whether such movement or status change is authorized or not.

65 Claims, 3 Drawing Sheets

METHOD AND APPARATUS FOR ASSOCIATING THE MOVEMENT OF GOODS WITH THE IDENTITY OF AN INDIVIDUAL MOVING THE GOODS

RELATED APPLICATION

The present application is related to and claims the priority benefit of co-pending U.S. Provisional Application 60/245,767, entitled "Controlled Access Coupled with the Movement of Goods", filed Nov. 3, 2000 by the present inventors.

FIELD OF THE INVENTION

The present invention relates generally to inventory control and, more particularly, to a system and method for monitoring the existence, location, and movement of objects in inventory as well as providing secure and traceable access to them.

BACKGROUND OF THE INVENTION

In today's fast-paced world, accurately monitoring the existence, location, and movement of objects in inventory is becoming increasingly important to businesses and other organizations. Although sophisticated systems exist to track objects (e.g., active and passive radio frequency identification (RFID) tags or other wireless devices, barcode scanners, PDAs, etc.), there are limitations with the current approaches.

One problem involves maintaining the ready availability of supplies that are critical to the proper functioning of an organization. This is particularly true for the growing number of companies whose businesses depend on their equipment being absolutely free from the interruption of service (e.g., failure of networking, computer, or communications equipment, etc.) that the lack of a replacement part may cause. To limit storage space and expense, businesses often keep inventory levels at a minimum. Suppliers and technicians store spare parts at forward stocking locations, remote depots, and public storage facilities in an attempt to keep inventory close to customers to reduce response times. However, failure by personnel to scan or to properly track and monitor inventory such as communications equipment and computer parts when they are moved from storage areas often results in erroneous information in the inventory system. Thus, supplies may not be tracked in real-time or replenished when necessary. Moreover, many methods do not provide visibility, let alone real-time visibility, into the actual inventory in a given location nor sufficiently control or secure access to valuable inventory. Existing approaches may provide some secure means of access such a locked door or cabinet using physical keys and/or a method for tracking and viewing inventory; however, none couple both of these methods such that a reliable system could know what and when a particular inventory item was removed by a particular person.

It would be helpful if a system existed to more efficiently track and monitor objects in inventory and to quickly and reliably decrement or increment items in stock while concurrently associating the movement of inventory with a particular person based on data automatically provided to the system rather than relying on a person to re-trace their steps and manually enter inventory changes via paperwork or independent computer interface.

SUMMARY

The present invention provides a system and method for determining the identity of an entity (e.g., an individual or an automated device) which entered a confined space and automatically associating, using a computer system, the identity with the removal or addition of objects in the confined space. In addition, unauthorized accesses to a controlled space and/or unauthorized movements of goods may be recorded and/or reported.

In one embodiment, the identity of the entity is determined at a controller associated with the confined space. The controller unlocks a locking mechanism that allows the entity to have access to the confined space. A tracking system coupled to the computer system monitors the movement of the entity and also the addition and/or removal of objects in the confined space. The computer system associates the identity with the addition or removal of objects and transmits this information to a server computer system. A user may access this information using client computers coupled to the server computer system. Similarly, any unauthorized accesses to the space and/or unauthorized movements of goods to/from/within the space may be recorded and/or reported by the computer system.

In another embodiment, the server computer system notifies a user through a network interface, telephone interface, or wireless interface of the movement of an object (and/or the association of the movement of the object with an identity). Such reports may be made for authorized and/or unauthorized movements. Objects may be automatically replenished or returned or a party may be billed as a result of the notification. For example, in one embodiment, the server computer system automatically notifies an organization's pre-existing inventory control system that an object has been removed from a confined space (e.g., from inventory) by a particular entity. Based on this information, the inventory control system may automatically take steps to replenish the object that was removed.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A system and method for associating the movement of goods with the identity of an individual or other entity responsible for or connected with such movement is described below. Although discussed with reference to certain illustrated embodiments, upon review of this specification, those of ordinary skill in the art will recognize that the present invention may find application in a variety of systems. Therefore, in the following description the illustrated embodiments should be regarded as exemplary only and should not be deemed limiting in scope.

In one embodiment, the present system and method allows for identifying who and/or what entered a confined space by virtue of identity information provided as the entity (i.e., a person or robot) enters the space or by the identity being interpreted and accepted by a controller which unlocks a locking mechanism to allow access to the space. The identity is then associated with the movement, addition or removal of objects in the space. In addition, the present scheme includes communicating information regarding objects in inventory to a server or other device on a demand and/or an on-going basis (any time interval). In another embodiment, the scheme includes communicating information regarding objects in inventory to a server or other device only when there is a change in inventory. Features of the system and method also include tracking the existence, location, and movement of objects in inventory, associating the movement of objects with an identity, and providing this information to an automated system and/or one or more individuals. This information may be used to automatically replenish stock, bill an appropriate party for goods, return objects to storage areas when necessary, and for other similar services related to the effective management of inventory in an organization.

In addition, unauthorized accesses to a controlled space may be reported and/or recorded. Such accesses may be deemed unauthorized if an appropriate entry code is not received by the controller. Further, unauthorized movements of goods within/to/from the space may be reported and/or recorded by the server.

By associating an identity with the movement of objects in inventory, stock may be utilized and maintained in a secure and traceable fashion. The likelihood of theft or improper documentation (e.g., as a result of personnel failing to scan a barcode when removing an item from inventory) is thus markedly decreased.

Figure 1A:
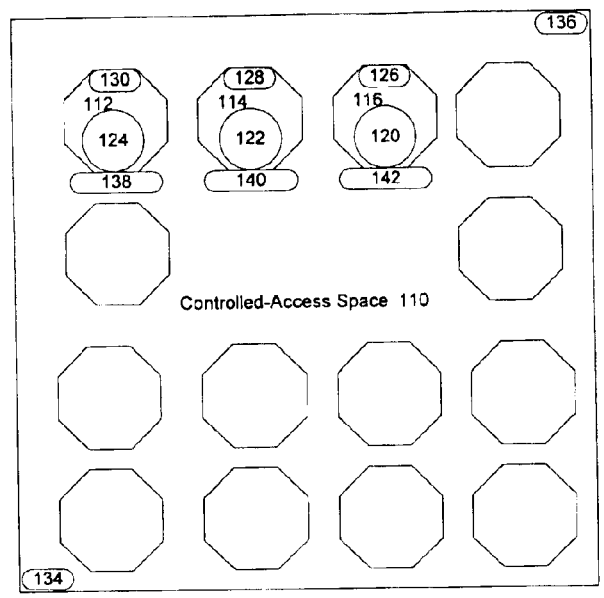
FIG. 1A is a schematic diagram illustrating a storage area configured in accordance with an embodiment of the present invention.

Referring now to FIG. 1A there is shown a schematic diagram illustrating a storage area 100 configured in accordance with an embodiment of the present invention. While the present invention is explained in the environment of storage room 110, the scope of the invention may also include other environments in which objects are stored and are occasionally removed on a permanent or temporary basis (e.g., video stores, libraries, rental stores, etc.). The storage room 110 may have multiple objects in inventory 112, 114, 116, etc., stored in a variety of ways (e.g., on shelves, in boxes, on tables, etc.). The objects in inventory 112, 114, 116, etc., may be any portable item which an organization desires to monitor so as to prevent unauthorized removal from the storage area 110 and also for inventory management purposes (e.g., so as to replenish items as necessary). For instance, items may include communications equipment (e.g., network routers, computers, facsimile machines, cellular phones, modems, etc.), portable computer media (e.g., computer disks, backup tapes, etc.), general office supplies (such as printers, paper, staplers, file folders, and the like) or any other valuable items that are necessary for the proper functioning of an organization. Of course, it should be noted that the present scheme is not limited to office equipment. For example, the storage room 110 may be in an organization in the industrial sector and the objects in inventory 112, 114, 116, etc., may be tools in a maintenance depot that are needed for a particular project (e.g., such as to repair an automobile or an airplane, etc.). In addition, it should be appreciated that the storage room 110 may also be a storage container or some other type of enclosure (not shown in this view) in which objects in inventory 112, 114, 116, etc., may be stored.

The storage room 110 also contains elements to monitor the objects in inventory 112, 114, 116, etc. According to one embodiment, the objects in inventory 112, 114, 116, etc., may be monitored by RFID tags 120, 122, 124, etc. As is well-known in the art, the RFID tags 120, 122, 124, etc., include an RF circuit for use in detecting when an RFID tag is within a zone monitored by a base station (such as a reader, interrogator, or some other device (not shown in this view)). The RFID tags 120, 122, 124, etc., may be mounted on the surface of an item in inventory, enclosed or embedded in the item, or otherwise secured to the item. For example, the RFID tags 120, 122, 124, etc., may be enclosed within the casing of a printed circuit board, cellular phone, facsimile machine, laptop computer, in the packaging material for an item, etc.

Wherever the RFID tags 120, 122, 124, etc., are located, the reader, interrogator, or other monitoring device utilizes wireless communication techniques to read and/or write information encoded within the RFID tags 120, 122, 124, etc., and to thus determine the location or simply the presence of the objects in inventory 112, 114, 116, etc. The RFID tags 120, 122, 124, etc., may be programmed (at manufacturing) with the model, serial number, or some other form of identification of the object in inventory 112, 114, 116, etc., such that the RFID tags 120, 122, 124, etc. are auto-identifying.

The RFID tags' unique identity may also be associated with an entity (i.e., human or robot) entering storage room 110. This allows identification information to be input into a remote inventory management system (not shown in this view) automatically or using a keyboard wedge barcode scanner (or other type of input device) connected to the remote inventory management system. Other types of tags may also be used such as infrared (IR), optical, ultrasound, or any other tags that enable communication with the reader, interrogator, or other monitoring device using wireless technology. It should also be appreciated that tags requiring some form of physical contact may also be utilized such as tags that use RF but require contact with a reader's antenna, for example, to activate them.

Of course, the objects in inventory 112, 114, 116, etc., may be monitored by virtually any other system and/or method utilized for object tracking well-known in the art of inventory control. For example, in other embodiments, objects in inventory 112, 114, 116, etc., may be monitored through the use of barcode labels 126, 128, and 130 placed on the objects in inventory 112, 114, 116, respectively, and scanned by barcode scanners as the objects in inventory 112, 114, 116, etc., are brought into or removed from the storage room 110, by video cameras 134 and 136 monitoring the storage room 110, by mechanical devices 138, 140 and 142 (for example, devices that register the weight or the absence of the weight of an item in a predefined location), by electronic tablets that capture human writing, or by any other means that can positively differentiate the presence or absence of the tracked item.

Figure 1B:
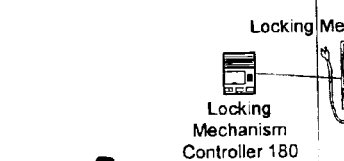
FIG. 1B illustrates an example of a locking mechanism controller for the storage area shown in FIG. 1A.
Figure 1B:
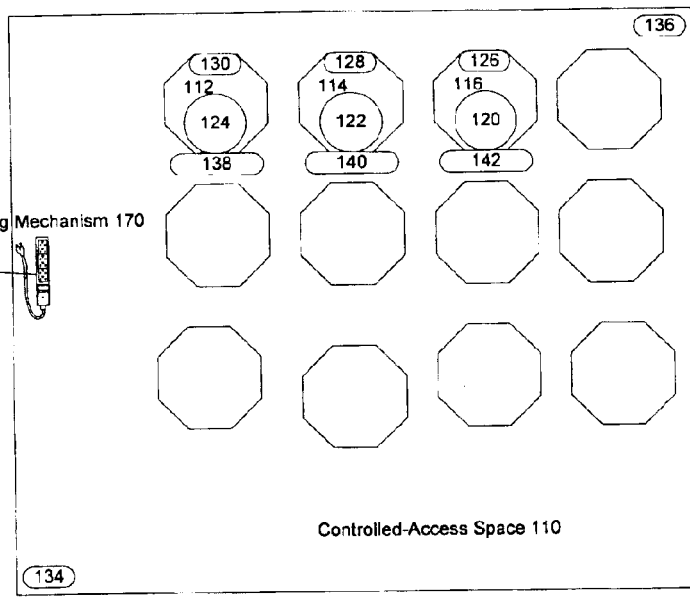

Referring now to FIG. 1B there is shown an example of a locking mechanism controller for the storage room 100 shown in FIG. 1A according to an embodiment of the present invention. In one embodiment, the identity of an entity 160 (i.e., a person or a robot) is interpreted and accepted by a locking mechanism controller 180 which unlocks a locking mechanism 170 to allow access to the storage room 110. The identity may be in the form of a name, an assigned re-usable code, an access card, a one-time access code issued to a given entity, or any other form of identification. For instance, in one embodiment the locking mechanism controller 180 is an access code entry unit which includes a keypad (not shown in this view) and is configured to accept user input (e.g., in the form of an identification number). In other embodiments, the locking mechanism controller 180 may operate in connection with other access code entry units such as a special barcode scanner (i.e., specially configured to modulate the laser beam transmitted by its laser diode, thereby transmitting an access code), a voice recognition system, a magnetic stripe or electronic card reader, an IR transmitter device, or any other type of mechanism by which the locking mechanism controller 180 may interpret and accept the identity 160. Of course, any or all these access means (or any other of a variety of access means) may be used in combination. Examples of locking mechanisms and controllers suitable for use with the present invention may be found in U.S. Pat. No. 6,300,873, entitled "Locking Mechanism for use with One Time Access Code, issued Oct. 9, 2001; and/or co-pending U.S. patent application Ser. No. 09/596,333, entitled "Adaptable Low-Power Electronic Locking Mechanism," filed Jun. 16, 2000; and U.S. patent application Ser. No. 09/599,034, entitled "Bidirectional Barcode Scanning System," filed Jun. 21, 2000, the complete disclosures of which are incorporated herein by reference.

In another embodiment, the expression of the identity of entity 160 may be automatic as the entity enters the storage room 110. For example, the entity 160 may have an RFID tag on a badge that is monitored by a reader, interrogator, or some other device (not shown in this view) in a manner described in the embodiment illustrated by FIG. 1A.

Figure 2:
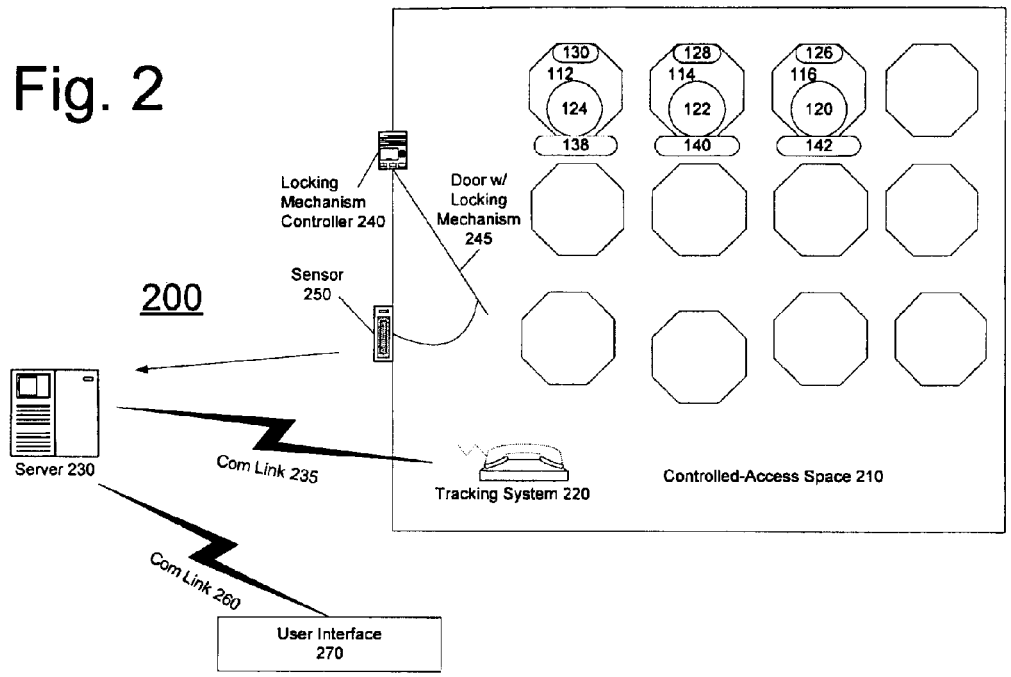
FIG. 2 is a schematic diagram illustrating a remote inventory management system communicating the ingress or egress of objects in inventory to a server computer system according to an embodiment of the present invention.

Referring now to FIG. 2 there is shown a schematic diagram illustrating a remote inventory management system communicating the ingress or egress of objects in inventory to computer system 200 according to an embodiment of the present invention. In one embodiment, the storage area 210 includes a tracking system 220, such as a wireless RFID system, which communicates with a server 230 via a communications link 235 (e.g., a radio modem that may support communication within a public or private wireless network). When the identity of an entity (not shown in this view) is interpreted and accepted by a locking mechanism controller 240 the entity is allowed access to the storage area 210. A sensor 250 may monitor the door 245 as it opens and closes. Thus, every time an action happens in the storage area 210 (e.g., an entity enters the storage area 210, the sensor indicates that the door has opened, the RFID system 220 indicates that objects in inventory have been removed, etc.), the information is transmitted to the server 230 via the wireless link 235.

Note that these accesses and/or movements of goods may be authorized or not. The action is recorded/reported in either case. Further, the wireless link 235 may be replaced and/or augmented by a wired communication link. In addition to the movement of goods, status (e.g., defective, return, etc.) may also be monitored.

A program in the server 230 (such as a database management system (DBMS)) maintains a record of the events in the storage area 210. The program thus associates the ingress and egress (or other movement) of the objects in inventory with a particular entity and may also keep track of other important data regarding the movement of the objects in inventory (such as the date and time of the movement, etc.). Of course, the information regarding the movement of objects in inventory and the association of those objects with an entity identity does not necessarily need to be transmitted to the server 230 via the wireless link 235. As discussed in the embodiments illustrated in FIG. 1A, a variety of non-wireless tracking systems (e.g., special barcode scanners, mechanical devices, etc.) may also be used to monitor the objects in inventory and the identity associated with the movement of those objects. This tracking information may be transmitted to the server 230 via network interfaces (dedicated or dial-up interfaces/connections that utilize a public computer network or a private computer network)(not shown in this view) or telephone interfaces (not shown in this view) adapted to provide communication with the server 230 through the public switched telephone network (PSTN). The movement of the objects in inventory may be communicated to the server 230 continuously or on an event-driven or periodic basis (any time interval). For instance, the server 230 may be updated every hour, every 24 hours, every other day, etc.

In addition, the server 230 may contain a program written in JAVA, C++, HTML, Perl, or SQL, for example, or in a combination of these programming languages or in any other programming languages utilized singularly or in combination, to correlate the movement of objects in inventory and the association of the movement of the objects in inventory with the identity. The server 230 may log this information as a record of an event in the storage area 210 using the DBMS. A user (not shown in this view) may access a record of an event in the storage area 210 using one or more client computers (see. e.g., user interface 270) coupled to the server 230 through the Internet, a corporate intranet, a Wide Area Network (WAN), a Local Area Network (LAN), or any other system of interconnections (see. e.g., communication link 260) enabling two or more computers to exchange information. In this manner, the user may access information regarding objects in inventory (e.g., to determine the presence and/or absence of objects in inventory, the location of an object in inventory, to reserve an object in inventory, etc.). The user may also obtain a one-time access code to unlock the locking mechanism controller 240 to the storage area 210.

In addition, the server 230 may automatically notify a user regarding an event in inventory (i.e., the removal or addition of an object in inventory associated with a particular identity) using a network interface, telephone interface, or wireless interface as described in the embodiment illustrated by FIG. 1A. For instance, in one embodiment the server 230 may notify an organization's pre-existing inventory system through a dedicated channel (not shown in this view) of an event in inventory (e.g., indicating that the organization now has one less item in stock at a particular location, etc.).

Upon completion of an event, the locking mechanism controller 240 may lock out all other entrants until the server 230 has taken into account (e.g., via the RFID system) all the objects in inventory in the storage area 210 (this may be referred to as the Lock-out Period). The same entity, however, may be allowed to re-enter the storage area 210 during the Lock-out Period for a designated period of time after leaving the storage area 210 (e.g., 30 seconds) by re-gaining access through the locking mechanism controller 240 (e.g., by using a voice recognition device, a barcode scanner, an electronic card reader, etc.).

Figure 3:
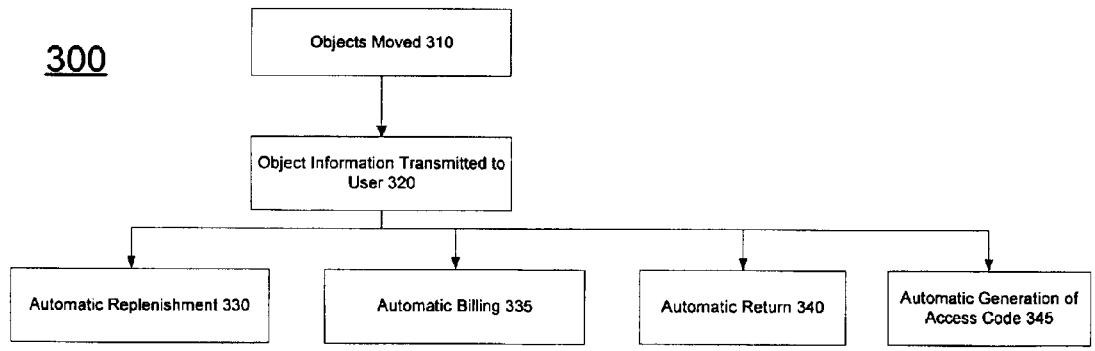
FIG. 3 is a flow chart illustrating a remote inventory management system automatically implementing inventory management solutions according to an embodiment of the present invention.

Referring now to FIG. 3 there is shown a flow chart 300 illustrating a remote inventory management system implementing inventory management solutions through a server computer system according to an embodiment of the present invention. In one embodiment, information regarding the ingress and egress or other movement of objects in inventory is transmitted by the remote inventory management system to a server and maintained in the server. Thus, when objects in inventory are depleted or otherwise moved (see step 310), this information may be transmitted (step 320) from the server to a user or client computer system through network interfaces, wireless interfaces, or telephone interfaces such as those described in the embodiment illustrated by FIG. 1A. Upon receiving this information, the user may take steps to replenish (step 330) the objects in inventory. Similarly, the user or other consuming party may be automatically billed (step 335) for the objects in inventory, or the objects may be automatically returned (step 340) to inventory. The auto-replenishment (step 330), auto-billing (step 335), and auto-return (step 340) of objects in inventory may be made on a continual or batch mode basis and may be made exclusive of one another. Further, an access code may be generated automatically as a result of the notification (step 345).

Figure 4:
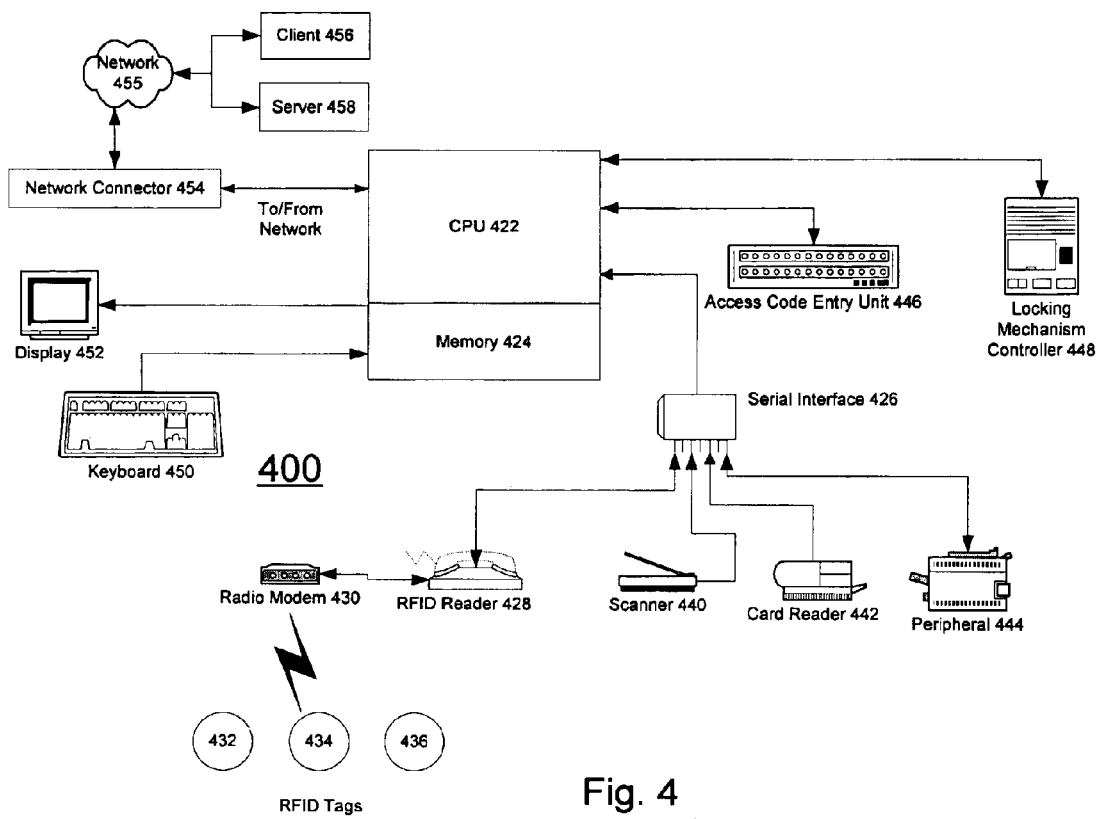
FIG. 4 is a schematic diagram illustrating components of a remote inventory management system according to an embodiment of the present invention.

Referring now to FIG. 4 there is shown a schematic diagram illustrating components of the remote inventory management system 400 according to an embodiment of the present invention. Each remote inventory management system 400 has its own unique identity, such that when information regarding the movement of objects in inventory associated with a particular identity (not shown in this view) is transmitted from a location to a server (not shown in this view), the server is able to identify what organization, company, etc., transmitted the information. Moreover, an organization may contain one or more remote inventory management systems and hundreds (if not thousands) of remote inventory management systems at varying locations may be coupled to the server via a wireless or physical link (not shown in this view).

In the present embodiment, the components of the remote inventory management system 400 include a central processing unit (CPU) or other controller (e.g., an ASIC or FPGA) 422 containing or having an associated memory 424. The CPU 422 is coupled to a serial or other interface 426 which provides the communication path for the CPU 422 to an RFID reader 428 (which communicates via a radio modem 430 to REID tags 432, 434, 436, etc.), a barcode scanner 440, a magnetic stripe or electronic card reader 442, and/or other peripheral devices 444 useful for the tracking of the ingress and egress or other movement of objects in inventory. The CPU 422 is also configured to receive inputs from an access code entry unit 446 and to unlock a locking mechanism controller 448 upon the interpretation and the acceptance of an access code by the CPU 422. Also coupled to the CPU 422 are Input/Output (I/O) devices including a keyboard (or other input device) 450 and a liquid crystal display (LCD) device (or other display) 452 which, in some cases, may be part of the access code entry unit 446 (e.g., to indicate to an entity an improper use of a magnetic stripe or electronic card reader, improper entry of an access code, etc.). A network connector 454 (e.g., wired or wireless network) may also be provided to allow for communication through network 455 with client computer(s) 456 and/or server(s) 458. Of course, there are many possible variations of the present embodiment.

Figure 5:
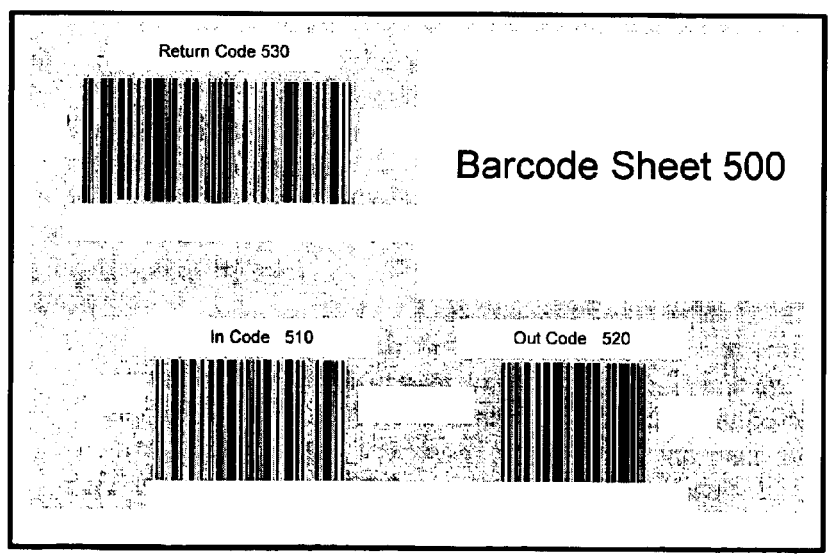
FIG. 5 is an illustration of a barcode sheet used to enter transaction data into a remote inventory management system according to an embodiment of the present invention.

Referring now to FIG. 5 there is shown an illustration of a barcode sheet 500 which may be used to enter transaction data into a remote inventory management system according to an embodiment of the present invention. A barcode scanner (not shown in this view) may be coupled to the CPU 422 as is described in the embodiment illustrated by FIG. 4. The barcode scanner may scan the individual barcodes encoded on barcode sheet 500 which barcodes include information regarding an object in inventory (e.g., the model and/or serial number of the object in inventory). A decoder converts the electronic signal representative of the scanned symbol into a computer-readable format (i.e., binary or textual information). The CPU receives the computer readable format of the model and/or serial number or other information regarding the object in inventory encoded in the barcode sheet 500. For example, a user may scan the "in" barcode symbol 510 when adding an object to inventory, scan the "out" barcode symbol 520 when removing an object from inventory, and scan the "return" 530 barcode symbol when returning an object to inventory. The CPU then transmits this information to a server as is described above.

Thus, a system for providing controlled access to storage locations and coupling such access to the movement of goods into, out of, or within such locations has been described. Although discussed with reference to certain illustrated embodiments, it should be remembered that the broader spirit and scope of the invention is only to be measured in terms of the claims that follow.

What is claimed:

1. A method, comprising:
    obtaining identity information regarding an entity which enters a controlled space;
    monitoring, using a wireless tracking system communicatively coupled to a computer system, locations and movements of the entity and objects within the controlled space;
    automatically associating, using the computer system, the identity information regarding the entity with status information regarding additions, removals, returns, defective status, or movements of the objects to/from/within the controlled space; and
    transmitting the status information and the associated identity information to a server communicatively coupled to the computer system and configured to automatically notify a user of the status information, wherein at least one of the objects is automatically returned or picked up as a result of such notification.

2. The method of claim 1 wherein the entity is identified by a controller associated with the controlled space, the controller being configured to unlock a locking mechanism to allow the entity to have access to the controlled space provided the entity is authorized to do so.

3. The method of claim 1 further comprising notifying the user of the addition, removal, return, defective status, or movement of the objects.

4. The method of claim 3 further comprising notifying the user of whether or not the addition, removal, return, defective status, or movement of the objects is authorized or not.

5. The method of claim 4 wherein authorization is determined according to the identity information.

6. The method of claim 1 wherein the wireless tracking system includes at least one tag affixed to one or more of the objects and the entity, each tag configured to communicate via a wireless link with the wireless tracking system.

7. The method of claim 1 wherein the wireless tracking system includes barcode labels affixed to one or more of the objects.

8. The method of claim 1 wherein the wireless tracking system includes video cameras monitoring the controlled space.

9. The method of claim 1 wherein the wireless tracking system includes one or more mechanical devices, including at least one device that registers an absence of a weight of an object in a predefined location.

10. The method of claim 1 wherein the& addition, removal, return, defective status, or movement of the objects to/from/within the controlled space is entered into the computer system by the entity using an input device.

11. The method of claim 1 wherein the server is communicatively coupled to the computer system via one of a wireless communication link, or a network communication link.

12. The method of claim 1 wherein the user accesses information regarding the addition, removal, return, defective status, or movements of objects to/from/within the controlled space associated with the identity information in the server through one or more client computers communicatively coupled to the server through a network.

13. The method of claim 12 wherein the network comprises the Internet.

14. The method of claim 1 wherein the notification is transmitted to the user via a wireless communication link, or a network communication link.

15. The method of claim 1 wherein objects are automatically replenished as a result of the notification.

16. The method of claim 1 wherein a party is automatically billed as a result of the notification.

17. The method of claim 1 wherein the server automatically decrements or increments inventory levels or changes the status of objects in response to data transmitted to the server.

18. The method of claim 1 wherein the server automatically correlates received information pertaining to the movement or status changes of objects with received associated identity information corresponding to the entity responsible for the movements or status changes of the objects.

19. The method of claim 1 wherein an access code is automatically generated as a result of the notification.

20. A machine-readable storage medium embodying a sequence of instructions executable by a machine to perform a method for automatically associating an identity of an entity with a movement of one or more objects in a controlled-access location, the method comprising:
   identifying, at a controller associated with the controlled-access location, an entity attempting to enter the controlled-access location;
   determining whether the entity is authorized to enter the controlled-access location based upon the entity identification;
   unlocking a locking mechanism to allow the entity to have access to the controlled-access location if the entity is authorized, wherein the entity may add, remove, return, move and/or update status of objects to/from/within the controlled-access location; and
   monitoring the location, movement, and status change of the entity and the objects within the controlled-access location using a wireless tracking system, wherein the movement of the objects within/to/from the controlled-access location is entered into a computer system by the entity using an input device.

21. The machine-readable storage medium of claim 20 wherein the wireless tracking system includes tags affixed to the entity and the objects configured to communicate via a wireless link with a monitoring device.

22. The machine-readable storage medium of claim 20 wherein the wireless tracking system includes tags configured to be activated through contact with a reader device.

23. The machine-readable storage medium of claim 20 wherein the wireless tracking system includes barcode labels which are scanned as the objects are added to or removed from the controlled-access location.

24. The machine-readable storage medium of claim 20 wherein the wireless tracking system includes video cameras monitoring the controlled-access location.

25. The machine-readable storage medium of claim 20 wherein the wireless tracking system includes one or more mechanical devices, including at least one device that is configured to register an absence of a weight of an object in a predefined location.

26. The machine-readable storage medium of claim 20 wherein the method further comprises re-locking the locking mechanism, and automatically locking out all other entities until the wireless tracking system has accounted for all remaining objects in the controlled-access location.

27. The machine-readable storage medium of claim 20 further comprising automatically associating the movement and/or status change of the objects with the identity of the entity, wherein data pertaining to the association and corresponding movement and/or status change of the objects is transmitted to a server through one or more of a wireless interface, or a network interface.

28. The machine-readable storage medium of claim 27 wherein the method further comprises allowing access to information in the server regarding the movement of the objects associated with the identity of the entity through one or more client computers coupled to the server through a network.

29. The machine-readable storage medium of claim 28 wherein the network comprises the Internet.

30. The machine-readable storage medium of claim 27 wherein the server is configured to automatically notify a user via one or more of a wireless interface, or a network interface, regarding an event corresponding to the movement and/or status change of the objects.

31. The machine-readable storage medium of claim 30 wherein objects are automatically replenished or returned as a result of the notification.

32. The machine-readable storage medium of claim 30 wherein a party is automatically billed as a result of the notification.

33. A computer system, comprising:
   a processing unit;
   a memory coupled to the processing unit; and
   a process executed from the memory causing the processing unit to (i) automatically associate an identity of an entity with movement and/or status changes of objects to/from/within a controlled space, (ii) monitor the location and movement of the entity and objects within the controlled space via a wireless tracking system coupled to the computer system, and (iii) associate the identity of the entity with the movement or status changes of the objects according to information which is entered into the computer system by the entity using an input device coupled to the computer system.

34. The computer system of claim 33 wherein the process further causes the processing unit to transmit information regarding the association of the movement or status changes of objects to/from/within controlled space with the identity of the entity to a server coupled to the computer system.

35. A method, comprising:
   obtaining identity information regarding an entity which enters a controlled space;

monitoring, using a wireless tracking system communicatively coupled to a computer system, locations and movements of the entity and objects within the controlled space;

automatically associating, using the computer system, the identity information regarding the entity with status information regarding additions, removals, returns, defective status, or movements of the objects to/from/within the controlled space; and transmitting the status information and the associated identity information to a server communicatively coupled to the computer system and configured to automatically notify a user of the status information, wherein an access code for the controlled space is automatically generated as a result of such notification.

36. The method of claim 35 wherein the entity is identified by a controller associated with the controlled space, the controller being configured to unlock a locking mechanism to allow the entity to have access to the controlled space provided the entity is authorized to do so.

37. The method of claim 35 further comprising notifying the user of the addition, removal, return, defective status, or movement of the objects.

38. The method of claim 37 further comprising notifying the user of whether or not the addition, removal, return, defective status, or movement of the objects is authorized or not.

39. The method of claim 38 wherein authorization is determined according to the identity information.

40. The method of claim 35 wherein the wireless tracking system includes at least one tag affixed to one or more of the objects and the entity, each tag configured to communicate via a wireless link with the wireless tracking system.

41. The method of claim 35 wherein the wireless tracking system includes barcode labels affixed to one or more of the objects.

42. The method of claim 35 wherein the wireless tracking system includes video cameras monitoring the controlled space.

43. The method of claim 35 wherein the wireless tracking system includes one or more mechanical devices, including at least one device that registers an absence of a weight of an object in a predefined location.

44. The method of claim 35 wherein the addition, removal, return, defective status, or movement of the objects to/from/within the controlled space is entered into the computer system by the entity using an input device.

45. The method of claim 35 wherein the server is communicatively coupled to the computer system via one of a wireless communication link, or a network communication link.

46. The method of claim 35 wherein a user accesses information regarding the addition, removal, return, defective status, or movements or of objects to/from/within the controlled space associated with the identity information in the server through one or more client computers communicatively coupled to the server through a network.

47. The method of claim 46 wherein the network comprises the Internet.

48. The method of claim 35 wherein the notification is transmitted to the user via a wireless communication link, or a network communication link.

49. The method of claim 35 wherein objects are automatically replenished as a result of the notification.

50. The method of claim 35 wherein a party is automatically billed as a result of the notification.

51. A method, comprising:

obtaining identity information regarding an entity which enters a controlled space;

monitoring, using a wireless tracking system communicatively coupled to a computer system, locations and movements of the entity and objects within the controlled space; and automatically associating, using the computer system, the identity information regarding the entity with status information regarding additions, removals, returns, defective status, or movements of the objects to/from/within the controlled space, which status information is entered into the computer system by the entity using an input device.

52. The method of claim 51 wherein the entity is identified by a controller associated with the controlled space, the controller being configured to unlock a locking mechanism to allow the entity to have access to the controlled space provided the entity is authorized to do so.

53. The method of claim 51 further comprising notifying the user of the addition, removal, return, defective status, or movement of the objects.

54. The method of claim 53 further comprising notifying the user of whether or not the addition, removal, return, defective status, or movement of the objects is authorized or not.

55. The method of claim 54 wherein authorization is determined according to the identity information.

56. The method of claim 51 wherein the wireless tracking system includes at least one tag affixed to one or more of the objects and the entity, each tag configured to communicate via a wireless link with the wireless tracking system.

57. The method of claim 51 wherein the wireless tracking system includes barcode labels affixed to one or more of the objects.

58. The method of claim 51 wherein the wireless tracking system includes video cameras monitoring the controlled space.

59. The method of claim 51 the wireless tracking system includes one or more mechanical devices, including at least one device that registers an absence of a weight of an object in a predefined location.

60. The method of claim 51 wherein the server is communicatively coupled to the computer system via one of a wireless communication link, or a network communication link.

61. The method of claim 51 wherein a user accesses information regarding the addition, removal, return, defective status, or movements or of objects to/from/within the controlled space associated with the identity information in the server through one or more client computers communicatively coupled to the server through a network.

62. The method of claim 61 wherein the network comprises the Internet.

63. The method of claim 51 wherein the notification is transmitted to the user via a wireless communication link, or a network communication link.

64. The method of claim 51 wherein objects are automatically replenished as a result of the notification.

65. The method of claim 51 wherein a party is automatically billed as a result of the notification.

* * * * *